(12) United States Patent
Nagao

(10) Patent No.: US 6,373,992 B1
(45) Date of Patent: Apr. 16, 2002

(54) METHOD AND APPARATUS FOR IMAGE PROCESSING

(75) Inventor: Kimitoshi Nagao, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/259,291

(22) Filed: Mar. 1, 1999

(30) Foreign Application Priority Data

Feb. 27, 1998 (JP) .......................................... 10-064579

(51) Int. Cl.⁷ ................................................ G06K 9/40
(52) U.S. Cl. ....................... 382/266; 382/275; 382/254; 358/447; 358/463
(58) Field of Search ................................ 382/263, 264, 382/266, 275, 254, 260, 261; 358/447, 463

(56) References Cited

U.S. PATENT DOCUMENTS

| | | | | |
|---|---|---|---|---|
| 5,134,667 A | * | 7/1992 | Suzuki | 382/164 |
| 5,231,677 A | * | 7/1993 | Mita et al. | 382/266 |
| 5,392,137 A | * | 2/1995 | Okubo | 358/462 |
| 5,410,619 A | * | 4/1995 | Fujisawa et al. | 382/254 |
| 5,666,443 A | * | 9/1997 | Kumashiro | 382/266 |
| 5,926,577 A | * | 7/1999 | Kasahara et al. | 382/266 |
| 6,055,340 A | * | 4/2000 | Nagao | 382/261 |
| 6,259,537 B1 | * | 7/2001 | Matama | 358/1.9 |

FOREIGN PATENT DOCUMENTS

| | | | | |
|---|---|---|---|---|
| EP | A2 0 800 114 | 10/1997 | ............ | G03C/8/40 |
| JP | 57-500311 | 2/1982 | ............ | G06K/9/56 |
| JP | 57-500354 | 2/1982 | ............ | G06F/15/20 |
| WO | WO 81/03096 | 10/1981 | ............ | H04N/5/14 |
| WO | WO 81/03097 | 10/1981 | ............ | H04N/5/14 |

OTHER PUBLICATIONS

"Relating Granularity to Graininess", Takafumi Noguchi, Journal of the Society of Photographic Science and Technology of Japan, 57(6), 415(1994).
"A Method for the Digital Enhancement of Unsharp, Grainy Photographic Images", Powell and B.E. Bayer, Proceedings of the International Conference on Electronic Image Processing, Jul. 26–28, 1982, pp. 179–183.

* cited by examiner

Primary Examiner—Thomas D. Lee
(74) Attorney, Agent, or Firm—Sughrue Mion, PLLC

(57) ABSTRACT

There is provided a method for processing a digital image for noise suppression and sharpness enhancement, comprising the steps of performing a sharpness enhancing process on original image data to create sharpness enhanced image data; performing a smoothing process on the original image data to create smoothed image data; subtracting the smoothed image data from the sharpness enhanced image data to create first edge/grain composite image data; performing an edge detection to determine an edge intensity data; using the edge intensity data to determine grainy fluctuation compressing coefficient data for compressing amplitude of an grainy fluctuation component in the grainy region; multiplying the first edge/grain composite image data by the grainy fluctuation compressing coefficient data to compress only the grainy fluctuation component in the grainy region, and to thereby create second edge/grain composite image data; and adding the second edge/grain composite image data to the smoothed image data to thereby create an processed image. There is also provided an image processing apparatus for implementing the above method. An improvement is thus achieved in both graininess and sharpness without causing any artificiality and oddities due to "blurry graininess".

13 Claims, 7 Drawing Sheets

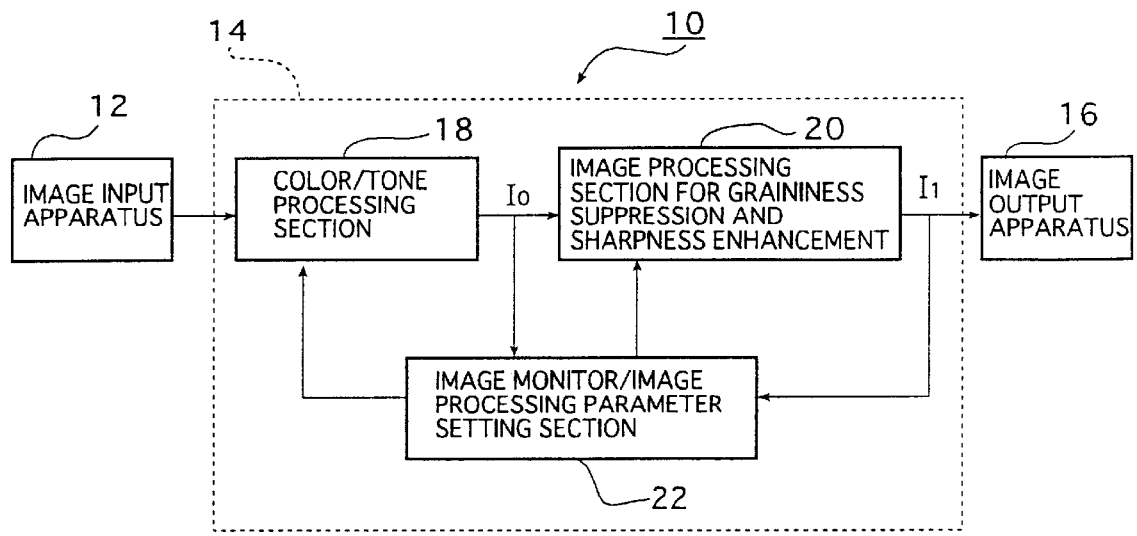
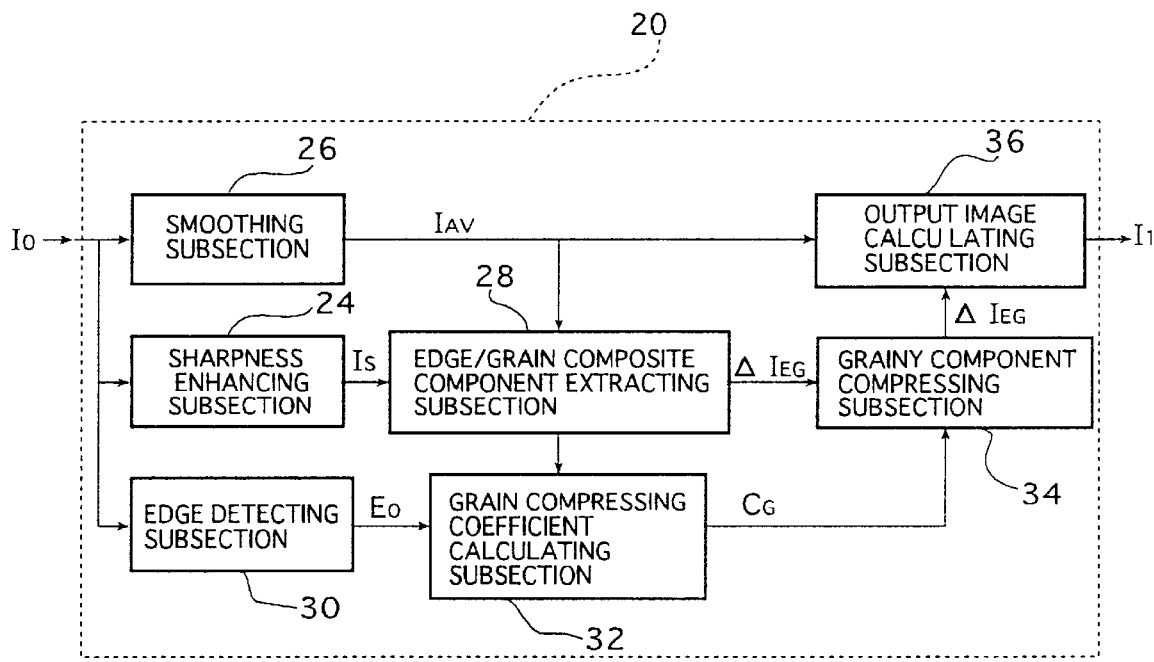

METHOD AND APPARATUS FOR IMAGE PROCESSING

BACKGROUND OF THE ART

This invention relates to a method and an apparatus for image processing for noise suppression and sharpness enhancement of digital images, or specifically to a method and an apparatus by which noise such as graininess in digital images can be suppressed while enhancing their sharpness.

In the present invention, the noise in digital image is called "grain or graininess" in view of the appropriateness of the expression if the image reproduced in photographs, printed documents and so forth is discussed and the noise region of a digital image being processed which consists of a noise component and which is to be separated from the edge region which consists of an edge (contour) component is called "a grainy or flat region" in view of the appropriateness of the expression if the image reproduced in photographs, printed documents and so forth is discussed.

In digital imaging technology which obtains pictures such as photographs with an image input scanner and which outputs digital images with an image output printer, considerable deterioration occurs in the sharpness of the output image due to the scanner and the printer. As a corrective procedure, sharpness enhancement is conventionally performed by means of a Laplacian filter or an unsharp masking (USM). However, sharpening the image causes the side effect of increasing noise such as graininess and, hence, grainy pictures can be subjected to only moderate sharpness enhancement within a range where graininess deterioration is tolerated; as a result, it has been difficult to obtain image quality better than that of the original grainy picture.

Several methods have been proposed to process digital images such as to remove noisy graininess and enhance their sharpness. Removal of graininess involves an averaging or blurring technique but the blurred grainy pattern is not pleasing to the eye or fine structures of the object may be erased in an unnatural way. For these and other reasons, the conventional techniques for removing graininess are not suitable for application to high-quality pictures such as photographs.

Pictures such as those in photographs, printed documents, or on television's screens and from various kinds of copiers suffer diverse deterioration problems, i.e., sharpness deterioration due to optics such as a camera, graininess and sharpness deterioration inherent in photographic materials, or noise and sharpness deterioration that is added when the original picture such as a photograph or a printed document is digitized with an image input device. In order to deal with these difficulties, various methods have been proposed to process images such as to reduce noise and enhance their sharpness. Smoothing and coring are two common methods employed in the conventional image processing technology for removing graininess, whereas sharpness enhancement is implemented by unsharp masking (USM) or processing with a Laplacian or a high-pass filter. However, if graininess is suppressed by these conventional methods of graininess removal, artifacts that cause unnatural and strange impressions will occur or fine structures of the image that should inherently be kept intact will be suppressed along with the graininess. See, for example, Japanese Domestic Announcement (koho) Nos. Sho 57-500311 and 57-500354, as well as P. G. Powell and B. E. Bayer, "A Method for the Digital Enhancement of Unsharp, Grainy Photographic Images" in the Proceedings of the International Conference on Electronic Image Processing, Jul. 26–28, 1982, pp. 179–183.

According to the method proposed by Powell and Bayer in these references, suppression of graininess is accomplished by smoothing (with a low-pass filter) and sharpness enhancement is performed with an unsharp masking (high-pass filter). In the smoothing process, signal values for n×n pixels are multiplied by Gaussian or other type of weights such that the signals are smoothed to suppress graininess. In the sharpness enhancement process, picture signals for m×m pixels are first used to determine differential values by calculation from the central pixel towards the surrounding pixels and if any differential value is smaller than a preset threshold, the pixel of interest is regarded as representing graininess or noise and removed by coring and the remaining differential values which are greater than the threshold are summed up, multiplied by a constant more than 1.0 and added to the previously smoothed signals, thereby achieving sharpness enhancement.

In this process, the density contrast of grainy patterns decreases since they are blurred; on the other hand, blurred grainy patterns may become visually pronounced as they are mottles of randomly crowded grains that cause graininess (this phenomenon is commonly referred to as "mottling") and they will present unpleasing graininess. In addition, a preset threshold is used as a criterion for distinguishing graininess from the picture (this is the coring process), so image signals of low contrast may occasionally be erroneously taken as graininess and suppressed or removed along with the latter or discontinuity may occur at the boundary between the removed image signal and the enhanced picture signal to produce an unnatural artifact in the output image. This drawback occurs very frequently in fine images such as those of lawn and carpets and in images that represent texture as in fabrics and the result is an artifact that is visually quite unnatural and hence undesirable.

In the above-described prior art method of processing images to suppress their graininess while enhancing their sharpness, unsharp masking is employed to enhance the sharpness whereas blurring or smoothing is effected to suppress the graininess, such that a graininess (noise) signal and a contour signal are separated from the original picture by signal level and the contour signal is subjected to sharpness enhancement whereas the smoothed region is suppressed in graininess and the smaller signal is regarded as representing graininess and processed accordingly; as a result, signals representing the fine details of the picture which are close to signal levels representing graininess, namely, image signals representing the texture of cloths, the hair on the head and the like, will be suppressed along with the graininess, yielding visually unpleasing images that contain artifacts from image processing In the conventional image processing technology where blurring or averaging is used as the method of suppressing graininess, a blurred grainy pattern is reduced in terms of density fluctuation; on the other hand, blurred grainy pattern spreads despite the small amount of density fluctuation and will be recognized as a visually unpleasing pattern, which stands out markedly in someone's face or skin as in portraits or in solid objects such as walls or sky.

In the prior art, a grainy (noisy) signal region and a contour region are separated from the original picture by signal level. Stated more specifically, the contour region and a flat region are discriminated on the basis of a signal indicating the difference between the original picture and a blurred image and the respective regions are processed with an unsharp masking, a Laplacian filter or other suitable means using different coefficients such that graininess is suppressed in the flat region whereas sharpness is enhanced in the contour region, thereby achieving graininess suppression without producing blurry edges. A problem with this technique is that discontinuity will occur at the boundary between the contour and grainy regions because the recognition and separation of these regions are performed indiscriminately with reference to a single threshold signal level.

It should also be mentioned that in the prior art which employs unsharp masking or a Laplacian filter for edge or sharpness enhancement, fringe (over shoot) such as Mach bands are most likely to occur along the contour or edges of the image, giving the visual impression of artificiality.

SUMMARY OF THE INVENTION

The present invention has been accomplished under these circumstances and it relates to an improvement of the technology of restoring images such as those in photographs, printed documents, or on television's screens, in digital still photographs and from various kinds of copiers so as to restore the camera-induced blur, the noise and the deterioration in sharpness which is inherent in the original picture as exemplified by graininess and blur in photographic materials or the noise and the deterioration in sharpness which has been added when digitizing the original picture with an image input device. As already mentioned, the prior art technology suffers three major problems: when a smoothing technique is applied to suppress graininess, the grain becomes blurred and mottling produces a visually unpleasing impression; low-contrast picture signals are mistaken for graininess and suppressed or eliminated; and the boundary between a region from which graininess has been removed and a region where sharpness enhancement has been done becomes discontinuous to produce unnatural artifacts in the output image.

An object of the present invention is to provide a method for processing digital images to suppress noise and enhance sharpness, by which graininess can be suppressed and image sharpness enhanced without causing any of the problems associated with the prior art.

Another object of the present invention is to provide an image processing apparatus for implementing the above method.

In order to achieve the first object, the present invention provides a method for processing a digital image for noise suppression and sharpness enhancement, comprising the steps of:

performing a sharpness enhancing process on original image data to create sharpness enhanced image data in which not only an image but also a grain or noise contained therein is sharpened;

performing a smoothing process on said original image data to create smoothed image data;

subtracting said smoothed image data from said sharpness enhanced image data to create first edge/grain composite image data comprising edges of a subject image and grains which are both enhanced in sharpness;

performing an edge detection of said original image data to determine an edge intensity data for discriminating an edge region of a subject and a grainy region;

using said edge intensity data to determine grainy fluctuation compressing coefficient data for compressing amplitude of an grainy fluctuation component in the grainy region;

multiplying said first edge/grain composite image data by said grainy fluctuation compressing coefficient data to compress only the grainy fluctuation component in the grainy region selectively, and to thereby create second edge/grain composite image data in which the grains in the grainy region are suppressed while retaining the sharpness of the edges in the edge region of the image; and adding said second edge/grain composite image data in which the grains are suppressed while enhancing the sharpness to said smoothed image data to thereby create an processed image.

In order to achieve the second object, the present invention also provides an apparatus for processing a digital image for noise suppression and sharpness enhancement, comprising:

a sharpness enhancing unit for performing a sharpness enhancing process on original image data to create sharpness enhanced image data in which not only an image but also a grain or noise contained therein is sharpened;

a smoothing unit for performing a smoothing process on said original image data to create smoothed image data;

an edge/grain composite component extracting unit for subtracting said smoothed image data from said sharpness enhanced image data to create first edge/grain composite image data comprising edges of a subject image and grains which are both enhanced in sharpness;

an edge detecting unit for performing an edge detection of said original image data to determine an edge intensity data for discriminating an edge region of a subject and a grainy region;

a grain compressing coefficient calculating unit for determining grainy fluctuation compressing coefficient data for compressing amplitude of an grainy fluctuation component in the grainy region based on the edge intensity data;

a grainy component compressing unit for multiplying said first edge/grain composite image data by said grainy fluctuation compressing coefficient data to compress only the grainy fluctuation component in the grainy region selectively, and to thereby create second edge/grain composite image data in which the grains in the grainy region is suppressed while retaining the sharpness of the edges in the edge region of the image; and an output image calculating unit for adding said second edge/grain composite image data in which the grains are suppressed while enhancing the sharpness to said smoothed image data to thereby create an processed image.

Preferably, said grainy fluctuation compressing coefficient data has a value equal or close to 1.0 in said edge region of said subject and is gradually decreased from said edge region toward said grainy region, where said compressing coefficient data takes a specified value ranging between 0.0–1.0.

Preferably, said grainy fluctuation compressing coefficient data is represented by equation (1):

$$C_G=(x,y)=(1-k_G)E_0(x,y)+k_G \qquad (1)$$

where $C_G(x,y)$ denotes the grainy fluctuation compressing coefficient data, $E_0$ denotes said edge intensity data (normalized $E_0$ ($0 \leq E_0 \leq 1$)), and $k_G$ denotes a grain compressing constant for adjusting the degree of compression of the grainy component in the grainy region and is a value ranging between 0.0–1.0.

Preferably, said edge detection is performed by one of a local variance method, a spatial first differential method and a spatial second differential method.

Preferably, said sharpness enhancing process is one of Gaussian unsharp masking, differentiation filtering and spatial frequency filtering.

Preferably, said smoothing process is one of processes directed to a real space domain and a spatial frequency domain.

Said edge detection, said sharpness enhancing process and said smoothing process are more preferably performed by a local variance method, Gaussian unsharp masking and Gaussian blurry masking, respectively. The processing is not limited to the Gaussian type, and any other type of processing may of course be used.

Said sharpness enhancement is preferably applied in a sufficiently intense manner, even though the image has a rather marked graininess without suppressing the graininess.

Preferably, the grainy fluctuation compressing coefficient data $C_G(x,y)$ is used to perform a weighting operation in the edge region of said subject, and the grainy region does not abruptly separate the edge region from the grainy region on the boundary thereof with two values of on/off, but gradually changes relative proportions of the two regions.

Preferably, said method for suppressing the graininess comprises performing the sharpness enhancing process on the original image data to make a grainy pattern spatially finer and to reduce the amplitude of the grainy fluctuation component. The spatial fining and amplitude reduction which correspond to fining of silver halide gains as photosensors in a silver halide photographic material, can provide a visually finer and pleasing granularity.

The image processing method and apparatus of the invention have the following effects:

1) An original image of which the sharpness was deteriorated due to a camera lens, a photographic film or optics including a scanner for digitizing films is subjected to the sharpness enhancing process to sharpen the subject image selectively.

2) A blurred and expanded grainy pattern is sharpened by the sharpness enhancing process. Further, a grainy pattern which is spatially finer irrespective of signal variation and which is pleasing to the eye can be obtained by reduction of the amplitude of the grainy fluctuation signals. This corresponds to fining of silver halide grains in silver halide color films.

BRIEF DESCRIPTION OF THE DRAWINGS

FIG. 1 is a block diagram showing an exemplary system in which a color photographic image is read and subjected to graininess suppression and sharpness enhancement in an image processing apparatus of the invention incorporated therein, and is output from an output apparatus;

FIG. 2 is a block diagram showing an exemplary image processing apparatus of the invention in which graininess suppression and sharpness enhancement are performed;

FIG. 5b shows a three-dimensional density profile of an edge detected image of the scene in FIG. 5a;

FIG. 6a shows a three-dimensional density profile of a sharpness enhanced image of the scene in FIG. 5a;

FIG. 6b shows a three-dimensional density profile of a smoothed image of the scene in FIG. 5a;

FIG. 7a shows a three-dimensional density profile of an edge/grain composite image of the scene in FIG. 5a;

FIG. 8a shows a three-dimensional density profile of an image obtained by compressing the edge/grain composite image of the scene in FIG. 7a.

DETAILED DESCRIPTION OF THE INVENTION

The method and apparatus of the invention for processing digital images to suppress their noise and enhance their sharpness are now described below in detail with reference to the preferred embodiments shown in the accompanying drawings.

Figure 3:
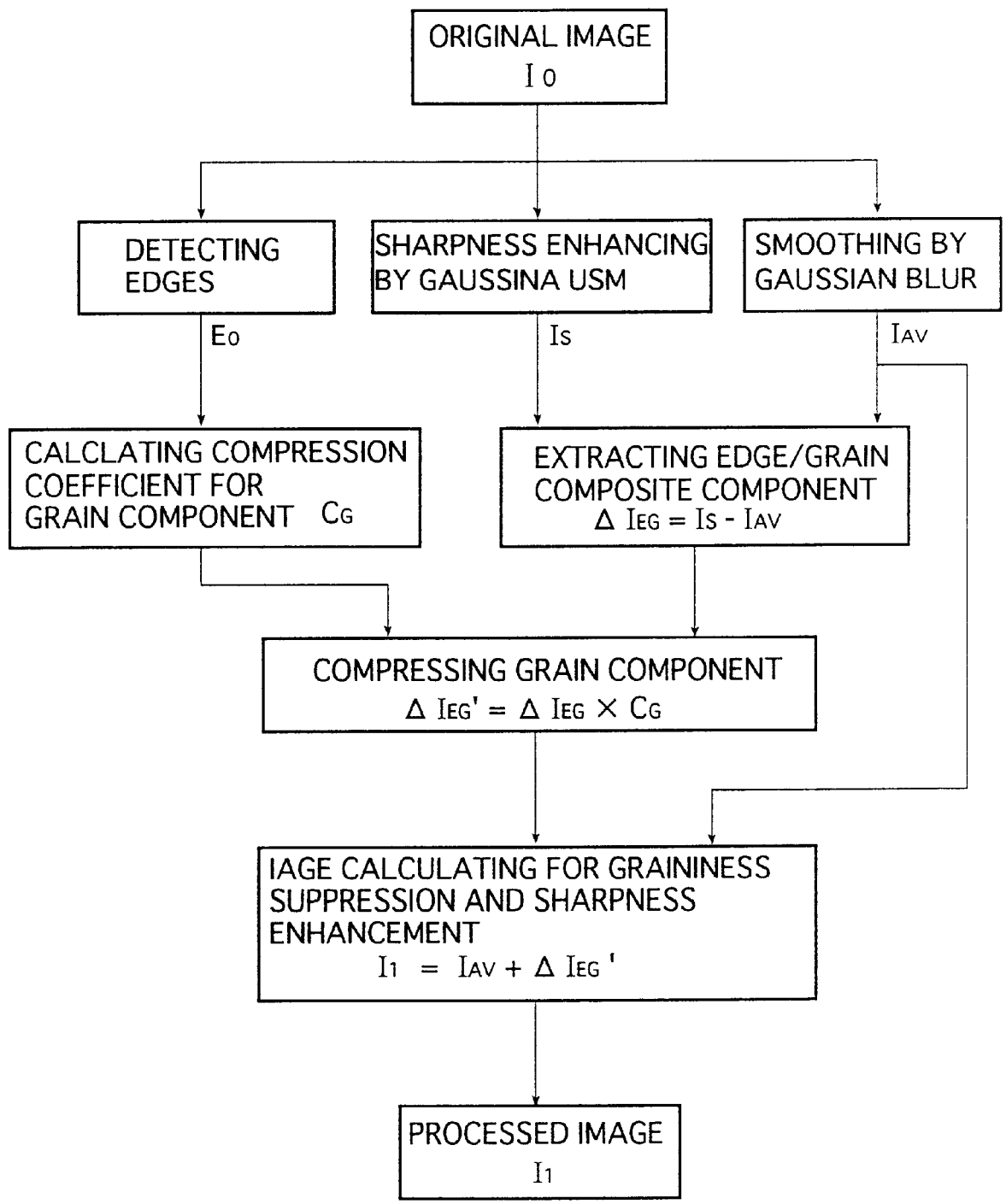
FIG. 3 is a flowchart for an embodiment of the method of the invention for processing images to suppress their graininess and enhance their sharpness.

FIG. 1 is a block diagram showing a color image reproducing system in which a color image is read, and the thus read color image is output after having been subjected to image processing steps such as graininess suppression and sharpness enhancement in an image processing apparatus of the invention incorporated therein. FIG. 2 is a block diagram showing an embodiment of the image processing apparatus for implementing the image processing method of the invention. FIG. 3 is a flow chart showing an exemplary processing algorithm of the image processing method of the invention. We now describe a color photographic image as a typical digital image.

As shown in FIG. 1, a color image reproducing system 10 comprises an image input apparatus 12 in which a color image such as a color photographic image (image on a film such as a color negative or reversal film, or an image taken with a digital camera or the like) is read to obtain digital input image data; an image processing apparatus 14 in which the image data input from the image input apparatus 12 is subjected to not only specified image processing steps, but also image processing for noise suppression and sharpness enhancement of the digital image according to the invention to thereby obtain output image data $I_1$; and an image output apparatus 16 for outputting the color image such as a print image based on the output image data $I_1$ output from the image processing apparatus 14.

The image input apparatus 12 is intended for outputting created digital color image data to the image processing apparatus 14 as input image data. Examples thereof include a film scanner in which an image on a color (or monochromic) film such as a color (or monochromic) negative or reversal film is read to create digital image data; a scanner for reflection original in which an image on a color reflection original such as a printed document or a reflection print is read to create digital image data; a driver in which a digital camera, digital still camera or video camera used in creating digital image data by direct photographing of a subject, or recording media for accommodating the created digital image data as exemplified by smart media, semiconductor memories including a PC card, magnetic recording media including an FD and a Zip, magneto-optical recording media such as an MO and an MD, optical recording media including a CD-ROM and a Photo-CD, are driven to read digital image data; a CRT monitor in which the digital image data is read to represent as a soft copy image; a display such as a liquid-crystal monitor; and computer systems including a PC and a WS for use in entire or partial image processing of the read or displayed digital image data.

The image output apparatus 16 is intended for outputting a color image having a color input image such as a color photographic image reproduced thereon, based on the image data output from the image processing apparatus 14 as finally processed image data. Specific examples include image output apparatuses including various types of digital color printers such as a digital photoprinter for outputting a color image on a hard copy (reflection print or reflection original), a copier, an electrophotographic printer, a laser printer, an ink-jet printer, a thermally sublimating printer and a TA; displays including a TV, a CRT monitor and a liquid-crystal monitor; and computer systems including a PC and a WS.

The image processing apparatus 14 characterizing the invention comprises a color/tone processing section 18, an image processing section for graininess suppression and sharpness enhancement 20 which is the most characterizing portion of the invention and an image monitor/image processing parameter setting section 22. The color/tone processing section 18 subjects the image data input from the image input apparatus 12 to color and tone (gradation) adjustment to obtain original image data $I_0$ which can be reproduced with desired color and tone in the image output apparatus 14. The image processing section 20 subjects the original image data $I_0$ obtained in the color/tone processing section 18 to the image processing method of the invention implemented for noise suppression and sharpness enhancement of a digital image, thereby creating output image data $I_1$. The section 22 includes an image monitor for displaying the reproduced image based on the image data with adjusted color/tone reproducibility, and an image processing parameter setting section to set parameters for various necessary image processing and the image processing of the invention.

The color/tone processing section 18 performs color conversion or color correction (including gradation conversion or correction) on the image data input from the image input apparatus 12 so that the color and tone (gradation) thereof can be appropriately reproduced in the image output apparatus 16, thereby creating the original image data $I_0$ for implementing the image processing method of the invention. Specific processing steps to be performed therein include a color (gray) conversion or correction, gradation correction, density (brightness) correction, saturation correction, magnification conversion, compression/extension of density dynamic range and so forth.

The image monitor/image processing parameter setting section 22 is composed of the image monitor and the image processing parameter setting section, and the image data input from the image input apparatus 12 is displayed on the image monitor based on the input image data. The image monitor is also used to set parameters for various image processing of the input image data to be performed in the color/tone processing section 18 and the image processing section for graininess suppression and sharpness enhancement 20 where the image processing method of the invention is implemented, by means of data input devices including a mouse and a keyboard (not shown). The parameters to be set therein include coefficients and other parameters necessary for implementing the image processing method of the invention to be described below, as exemplified by correction coefficients, conversion coefficients and magnifications to be used in various processing as described above.

The image processing section for graininess suppression and sharpness enhancement (which is hereinafter referred to simply as "main image processing section") 20 subjects the original image data $I_0$ created in the color/tone processing section 18 to image processing for graininess suppression and sharpness enhancement characterizing the invention, thereby creating the finally processed image data $I_1$ to be output to the image output apparatus 16.

As shown in FIG. 2, the main image processing section 20 includes a sharpness enhancing subsection 24 to perform sharpness enhancement on the original image data $I_0$ to create a sharpness enhanced image data $I_s$ with the image and the grain or noise contained therein being sharpened; a smoothing subsection 26 to perform smoothing on the original image data $I_0$ to create a smoothed image data $I_{AV}$; an edge/grain composite component extracting subsection to subtract the smoothed image data $I_{AV}$ from the sharpness enhanced image data $I_S$ to create a first edge/grain composite image data $\Delta I_{EG}$ in which edges of a subject image and grains are both enhanced in sharpness; an edge detecting subsection 30 to detect edges from the original image data $I_0$ to determine edge intensity data or an edge component $E_0$ for discriminating an edge region of the subject from the grainy region; a grain compressing coefficient calculating subsection 32 to determine from the edge component $E_0$ the grainy fluctuation compressing coefficient $C_G$ for compressing the amplitude of the grainy fluctuation component in the grainy region; a grainy component compressing subsection 34 for multiplying the first edge/grain composite image data $\Delta I_{EG}$ obtained in the edge/grain composite component extracting subsection by the grainy fluctuation compressing coefficient $C_G$ to create a second edge/grain composite image data $\Delta I_{EG}'$ in which graininess is suppressed while maintaining sharpness of the edge region on the image; and an output image calculating subsection 36 for adding the second edge/grain composite image data $\Delta I_{EG}'$ with suppressed graininess and enhanced sharpness to the smoothed image data $I_{AV}$ created in the smoothing subsection 26, to thereby create the finally processed image data $I_1$ to be output to the image output apparatus 16 as output image data.

The image processing section for graininess suppression and sharpness enhancement 20 shown in FIG. 2 is basically composed as described above. We now describe in greater detail the operation of the main processing section 20 and the image processing method of the invention with reference to the flow chart in FIG. 3 showing the processing algorithm of the image processing method of the invention.

First, for each pixel, a sharpness enhanced image $I_S$ and a smoothed image $I_{AV}$ are created from an original image $I_0$ in the sharpness enhancing subsection 24 and the smoothing subsection 26, respectively and first edge/grain composite fine image data $\Delta I_{EG}$ is extracted in the edge/grain composite component extracting subsection, as shown in FIGS. 2 and 3. In a separate step, an edge component $E_0$ of the subject in the original image $I_0$ is detected from the original image $I_0$ in the edge detecting subsection 30 and grainy component compressing coefficient data $C_G(x,y)$ is determined in the grain compressing coefficient calculating subsection 32. The coefficient $C_G(x,y)$ has a value close to 1.0 in the edge region and the original image component is retained without compressing the first edge/grain composite fine image data $\Delta I_{EG}(x,y)$. The coefficient $C_G(x,y)$ has a value ranging between 0.0–1.0 in the grainy region and the signals of the grainy component are compressed.

The grainy component compressing subsection 34 multiplies the grainy component compressing coefficient data $C_G(x,y)$ by the edge/grain composite fine image data $\Delta I_{EG}(x,y)$ previously determined to compress the grainy component in the grainy region while retaining the original edge/grain composite fine image data in the edge region. This processing can provide the second edge/grain composite fine image data $\Delta I_{EG}'$ with suppressed grainy component and sharpened edge component.

The second edge/grain composite fine image data $\Delta I_{EG}'$ is added to the smoothed image $I_{AV}$ in the output image calculating subsection 36 to obtain the processed image $I_1$ with suppressed graininess and enhanced sharpness.

According to the present invention, intense sharpness enhancement is performed on the original image to sharpen the graininess and noise together with the subject image; the edges of the subject are detected from the original image to calculate a coefficient for compressing the amplitude of the grainy fluctuations based on the edge signal; and the grainy component compressing coefficient is used to compress only the grainy component selectively, thereby suppressing the graininess. The characteristic features of the invention are as follows: spatially finer graininess and more reduced amplitude can be realized, which has an effect of graininess suppression corresponding to the fining of silver halide grains in a silver halide color film; sharpness of the subject in the image can be also significantly improved.

The grainy component compressing coefficient is determined in accordance with the value of the edge intensity, so that the coefficient takes in the center of the subject edge a maximum value of 1.0 or less, said value becoming smaller from the edge region toward the grainy region, where the coefficient takes a predetermined value. Therefore, the boundary between the grainy region and the edge of the image is not as abrupt as occurs when a circuit is switched on and off. The two regions overlap and their relative proportions vary so smoothly that the boundary will not stand out markedly but will give a quite natural impression.

The image processing algorithm of the invention used to suppress image graininess or noise while enhancing sharpness may be applied to digitized image data for processing with a computer or a dedicated image processing apparatus 14.

The individual steps in the image processing method of the invention will be described below briefly with reference to FIGS. 2 and 3, respectively.

1) Sharpness Enhancing Step by Sharpness Enhancing Subsection 24

Using a Gaussian unsharp masking (USM), fairly extensive sharpness enhancement is performed on the original image $I_0$ so as to remedy the blur from the image input/output system and to provide better sharpness than is achieved on optical prints; this step yields a sharpness enhanced image $I_S$.

2) Smoothing Step by Smoothing Subsection 26 and the Step of Extracting Edge/grain Composite Component by Edge/grain Composite Component Extracting Subsection A smoothed image $I_{AV}$ (x,y) is generated from the original image $I_0$ (x,y) by such means as averaging or using a blurring mask; the smoothed image $I_{AV}$ (x,y) is subtracted from the sharpness enhanced image $I_S$ (x,y) to generate first edge/grain composite fine image data $\Delta I_{EG}$ (x,y) according to the following equation (2):

$$\Delta I_{EG}(x,y)=I_S(x,y)-I_{AV}(x,y) \tag{2}$$

3) Step of Detecting Edges by Edge Detecting Subsection 30 and Step of Calculating Grainy component Compressing Coefficient Data by Grain Compressing Coefficient Calculating Subsection 32

The edges of the subject are detected from the original image $I_0$ to determine an edge intensity $E_0$ using a suitable technique such as a local variance method. The edge intensity $E_0$ is used in the following equation (1) to calculate the grainy component compressing coefficient data $C_G$ (x,y):

$$C_G(x,y)=(1-k_G)E_0(x,y)+k_G \tag{1}$$

where $k_G$ denotes a constant for adjusting the degree of compression of the grainy component in the grainy region. A value having a preferred effect of graininess suppression is selected as $k_G$ in the range of 0.0–1.0.

4) Step of compressing grainy component by grainy component compressing subsection 34

The previously determined first edge/grain composite component $\Delta I_{EG}$ (x,y) in which the edge region of the subject image and grainy region were both subjected to sharpness enhancement can be multiplied by the grainy component compressing coefficient data $C_G$ of the equation (1) to obtain the second fine image data $\Delta I_{EG}'$ (x,y) in which the grainy component in the grainy region is only compressed, as shown in the following equation (3).

$$\Delta I_{EG}'(x,y)=C_G(x,y)\cdot\Delta I_{EG}(x,y) \tag{3}$$

5) Step of calculating final image with suppressed graininess and enhanced sharpness by output image calculating subsection 36

The second fine image data $\Delta I_{EG}'$ (x,y) in which the grainy component is only compressed as calculated by the equation (3) is added to the smoothed image $I_{AV}$(x,y) previously determined, thereby obtaining a processed image $I_1$ (x,y) in which the edge region of the subject in the original image $I_0$ (x,y) has been sharpness enhanced whereas the grainy region has been suppressed in graininess:

$$I_1(x,y)=I_{AV}(x,y)+\Delta I_{EG}'(x,y) \tag{4}$$

The pictures to be processed by the image processing method of the invention are not limited to any particular kinds and they include not only pictures on hard copies such as photographs using a silver halide film, photographs by a digital camera, printed documents and outputs from copiers but also pictures on soft copies such as those displayed on television's screen, computer's CRT and liquid-display devices.

In the foregoing description, graininess has been taken as a typical example of the noise that need be suppressed in the pictures just mentioned above. However, this is not the sole case of the invention and it may be applicable to any types of noise that come out grainy in reproduced images, as exemplified by the noise inherent in the original picture due, for example, to camera-induced blurs and the grain and blurring of a photographic material, the noise that is added when the original picture is read with an image input apparatus such as a scanner and converted to a digital image, and the noise that comes in when image is picked up with a video camera, an digital still camera or a digital camera and converted to a digital image.

The individual steps in the image processing method of the invention will now be described below in greater details.

1) To Begin with, the Step of Sharpness Enhancement by Sharpness Enhancing Subsection 24 is Described.

Well know methods of enhancing the sharpness of a picture may be exemplified, for example, unsharp masking (USM), differentiation filtering and spatial (frequency) filtering. The unsharp masking may include following various methods of obtaining weighing coefficients of the mask. These obtaining method may be exemplified by, for example, Gaussian USM, gradient inverse weighted mean USM, zonal filtering USM, large difference attenuation USM, statistical differencing USM, relaxed USM, selective image sharpening and the like. Filters used to the differentiation filtering may be exemplified by, for example, Laplacian filter, Pseude-Laplacian filter and the like. The spatial filtering may be exemplified by, for example, filtering methods employing Fourier transformation, wavelet transformation and the like. The unsharp masking (USM) and the Laplacian filtering are preferably applied to the present invention among the sharpness enhancing methods described above. If the deterioration in the sharpness of the original image is not too great, these methods may effectively be used in the invention to enhance the sharpness of the picture.

Unsharp masking is a method of determining a sharpness enhanced image $I_S(x,y)$ by the following equation (5), in which the original image $I_0(x,y)$ is averaged or blurred to yield an image $<I_0(x,y)>$ which is subtracted from $I_0(x,y)$ to give an edge enhanced component $I_0(x,y)-<I_0(x,y)>$, which is subsequently multiplied by a factor a and added to the original image $I_0(x,y)$:

$$I_S(x,y)=I_0(x,y)+a[I_0(x,y)-<I_0(x,y)>] \quad (5)$$

where a is a constant for adjusting the degree of sharpness enhancement and x,y are coordinates representing the position of a pixel of interest in the picture.

Laplacian filtering is a method of enhancing the sharpness of an image $I_0(x,y)$ by subtracting a second partial derivative (Laplace operator or Laplacian) $\nabla^2 I_0(x,y)$ from the original image, as expressed by the following equation (6):

$$I_S(x,y)=I_0(x,y)-\nabla^2 I_0(x,y) \quad (6)$$

Common specific examples of sharpness enhancement by Laplacian filtering are the following 3×3 coefficient arrays:

0 −1 0  −1 −1 −1  1 −2 1
−1 5 −1  −1 9 −1  −2 5 −2
0 −1 0  −1 −1 −1  1 −2 1 (7)

With these coefficient arrays, particularly when intense sharpness enhancement is applied, an unnatural contour is most likely to occur along the edges of the picture. In order to minimize this problem, unsharp masking is preferably performed in the invention using a normal distribution (Gaussian) blurring function as expressed by the following equation (8):

$$G(x,y)=(1/2\pi\sigma^2)\exp[-(x^2+y^2)/2\sigma^2] \quad (8)$$

where $\sigma^2$ is a parameter representing the spread of the normal distribution function.

By ensuring that the ratio of the value of G(x,y) at a mask end $X=X_1$ to the value of the same function at the mask center x=0, which is expressed by the following equation:

$$G(x_1,0)/G(0,0)=\exp[-x_1^2/2\sigma^2] \quad (9)$$

is adjusted to lie between 0.1 and 1.0, a 3×3 unsharp mask can provide the desired sharpness. If the value of equation (9) is adjusted to be close to 1.0, one can generate a mask that is substantially identical to the center Laplacian filter in equation (7).

The mask sharpness can also be varied by adjusting the mask size; for example, the spatial frequency range for sharpness enhancement can be substantially altered by using masks of varying size such as 5×5, 7×7 and 9×9.

The function expressing the mask may be other than the one of a normal distribution, for example, an exponential function given by the following equation (10):

$$E(x,y)=\exp[-(x^2+y^2)^{1/2}/a] \quad (10)$$

where a is a parameter which has the same meaning as $\sigma^2$ in equation (8) and represents the spread of the unsharp mask.

By ensuring that the ratio of the value of E(x,y) at a mask end $x=x_1$ to the value at the mask center x=0, which is expressed by the following equation:

$$E(x_1,0)/E(0,0)=\exp[-x_1/a] \quad (11)$$

is adjusted to lie between 0.1 and 1.0, a 3×3 unsharp mask can provide the desired sharpness. When $E(x_1,0)/E(0,0)=$ 0.3, the mask of an exponential function according to equation (10) may numerically assume the following values:

0.18 0.30 0.18

0.30 1.00 0.30

0.18 0.30 0.18 (12)

From this mask, an unsharp mask having the following values of the respective elements may be calculated:

−0.12 −0.22 −0.12

−0.21 2.32 −0.21

−0.12 −0.21 −0.12 (13)

Using this unsharp mask, one can determine a sharpness enhanced image $I_S(x,y)$ from the original image $I_0(x,y)$. It should be noted that the unsharp mask and the method of sharpness enhancement that can be employed in the invention are by no means limited to the examples described above and any other known unsharp masks and methods of sharpness enhancement by means of spatial frequency filter and the like may of course be applicable.

2) We Next Describe the Smoothing Step by Smoothing Subsection 26.

Smoothing techniques can be classified as two processes, one being directed to a real space domain and the other to a spatial frequency domain. Processes directed to a real space domain include i) summing up the values of successive adjacent pixels, calculating the average of those values and substituting the average; ii) multiplying the values of respective pixels by weighting coefficients, for example, normal distribution functions and determining the weighted average; and iii) nonlinear processing as with a median filter. Moreover, in addition to these methods, the real space domain processings may be exemplified by, for example, Gaussian filter, K-nearest neighbor averaging, edge and line weights method, contrast-sensitive weights, relaxation method, gradient inverse weights smoothing, edge preserving smoothing, slope facet model smoothing, histeresis smoothing, maximum homogeneity smoothing, slope facet model smoothing, sigma filter, adaptive nonlinear filter, generalized mean filter, E-filter (nonlinear low frequency filter), convolution of PSF (point spread function) and the like. Processes directed to a spatial frequency domain include the multiplication by a low-pass filter. Moreover, in addition to this, the spatial frequency domain processings may be exemplified by, for example, spatial (frequency) filtering method employing Fourier transformation, filtering method employing wavelet transformation and the like. The averaging process using weighting coefficients may be expressed by the following equation (14):

$$I_{AV}(x, y) = \frac{1}{n^2}\sum_{i=1}^{n}\sum_{j=1}^{n} w(i, j)I_0(x+i-n/2-1/2, y+j-n/2-1/2) \quad (14)$$

where n is an averaging mask size and w is a weighting coefficient. If w=1.0, a simple mean is obtained.

The following description of the invention assumes the use of a process directed to a real space domain, particularly, the averaging of values weighted by weighting coefficients of a normal distribution type. It should, of course, be noted that this is not the sole case of the invention. The processing mask to be used in the illustrated case is preferably an array of n×n pixels as set forth below. Specifically, masks of sizes on the order of 3×3, 5 ×5, 7×7 and 9×9 pixels are preferably employed:

$$w_{11}w_{12}w_{13}\ldots w_{1n}$$
$$w_{21}w_{22}w_{23}\ldots w_{2n}$$
$$w_{31}w_{32}\ w_{33}\ldots w_{3n}$$
$$\ldots$$
$$\ldots$$
$$w_{n1}\ w_{n2}\ w_{n3}\ldots w_{nn} \quad (15)$$

An exemplary mask of 9×9 pixels is shown below by formula (16) which is normalized to 1.0 at the central value. In actual processing, the values of the respective pixels are so selected that their total sum is 1.0.

0.09 0.15 0.22 0.28 0.30 0.28 0.22 0.15 0.09

0.15 0.26 0.38 0.47 0.51 0.47 0.38 0.26 0.15

0.22 0.38 0.55 0.69 0.74 0.69 0.55 0.38 0.22

0.28 0.47 0.69 0.86 0.93 0.86 0.69 0.47 0.28

0.30 0.51 0.74 0.93 1.00 0.93 0.74 0.51 0.30

0.28 0.47 0.69 0.86 0.93 0.86 0.69 0.47 0.28

0.22 0.38 0.55 0.69 0.74 0.69 0.55 0.38 0.22

0.15 0.26 0.38 0.47 0.51 0.47 0.38 0.26 0.15

0.09 0.15 0.22 0.28 0.30 0.28 0.22 0.15 0.09 (16)

Using a mask of this kind, one can determine a smoothed image $I_{AV}(x,y)$ from the original image $I_0(x,y)$. Needless to say, the methods described above are not the only way to perform smoothing in the present invention and any other known smoothing methods are equally applicable.

3) We Next Describe the Step of Extracting a Component Containing both the Grain and Edges.

The difference between the sharpness enhanced image $I_S(x,y)$ obtained in step 1) and the smoothed image $I_{AV}(x,y)$ obtained in step 2) is determined and extracted as a first edge/grain composite component $\Delta I_{EG}(x,y)$ according to the following equation:

$$\Delta I_{EG}(x,y)=I_S(x,y)-I_{AV}(x,y) \quad (17)$$

4) We will now Describe the Step of Edge Detection by Edge Detecting Subsection 30. In the Following Description, Detection of Edges by a Local Variance Method is Assumed as a Typical Example but this is not the Sole Case of the Invention.

(1) Preliminary Processing: Density Conversion

The first step of edge detection is multiplying the density values $D_R$, $D_G$ and $D_B$ of R, G and B, respectively, in the original image $I_0(x,y)$ by weighting factors r, g and b to convert them into a visual density $D_V$ according to the following equation (18):

$$D_V=(rD_R+gD_G+bD_B)/(r+g+b) \quad (18)$$

Figure 4:
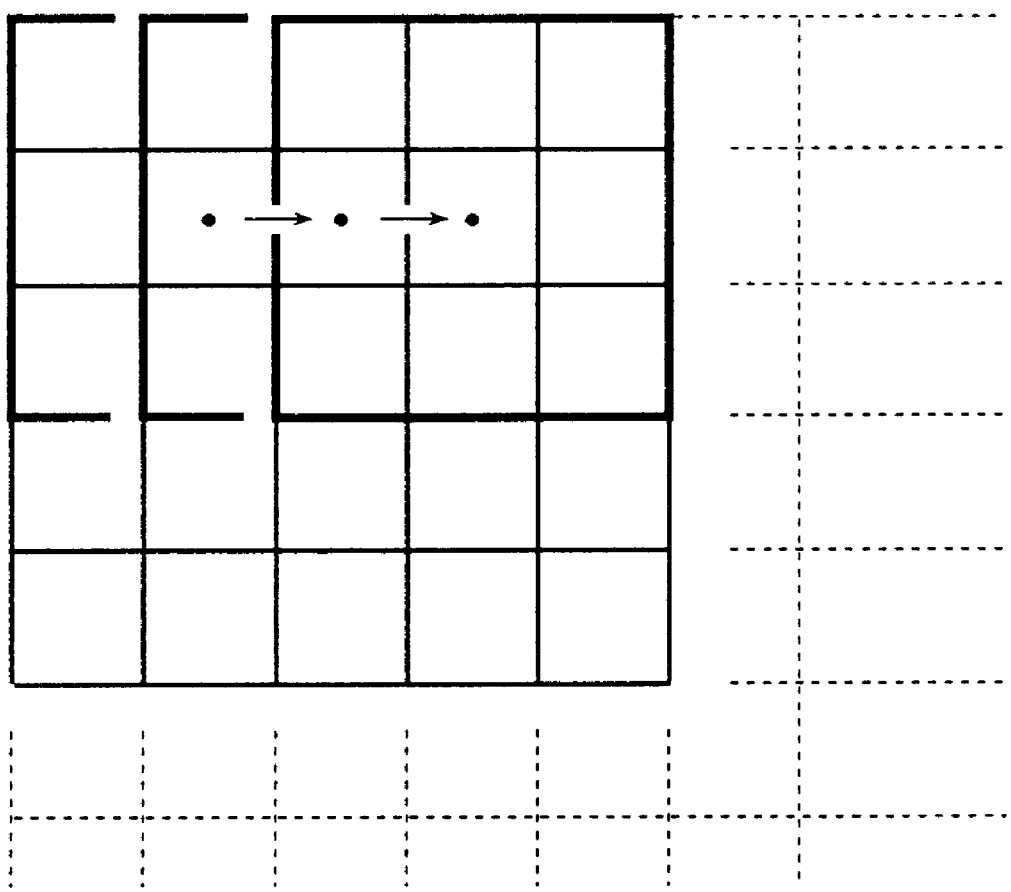
FIG. 4 is an illustration of a method of moving a square pixel array in edge detection that is performed by a local variance method in the image processing method of the invention.

The weighting factors r, g and b may take on values such as 4, 5 and 1. The purpose of conversion to the visual density $D_v$ is to reduce graininess and noise having no correlationship between R, G and B so as to improve the precision of edge detection. The array to be used in the preliminary processing is preferably of a size of about 5×5 or 7×7 pixels and this is to ensure that in the next step (2), the variations in the densities of pixels within the array can be calculated with a smaller array, say, of about 3×3 pixels being successively moved as shown in FIG. 4.

The weighting factors r, g and b for edge detection may be determined by the following way. In principle, they are preferably set to optimal values based on the idea that image data for a color of greater contribution that stands out when observed visually (one might as well consider that the relative conspicuity of the color corresponds to the associated spectral luminous efficiency) have greater weighting factors. Generally, empirical weighting factors have been determined on the basis of experiments for visual evaluation and the following values are available as a general finding (which is documented in Takafumi Noguchi, "Relating Granularity to Graininess", Journal of The Society of Photographic Science and Technology of Japan, 57 (6), 415 (1994); depending on colors, the reference sets forth numerical figures close to the ratios listed below):

r:g:b=3:6:1 r:g:b=4:5:1 r:g:b=2:7:1 (19)

A preferred range of the values to be taken by the ratio r:g:b may be specified as follows: assuming r+g+b=10.0 and b=1.0, g is preferably in the range of 5.0–7.0, provided that r=10.0−b−g.

(2) Edge Detection by a Local Variation Method

As shown in FIG. 4, an array of $n_E \times n_E$ pixels selected from the image data of visual density $D_V$ is moved as the variations in the densities of pixels within the preprocessing array are successively calculated by the following equation (20), with the local standard deviations σ for successive positions of move being taken as local variances, whereby the edges of the subject of interest in the picture are detected. The size of the moving pixel array, $n_E \times n_E$, may be determined as appropriate for the precision of detection and the load on calculations; a preferred array size is on the order of 3×3 or 5×5 pixels:

$$\sigma(x, y) = \left\{ \frac{1}{n_E^2} \sum_i \sum_j (D_{ij} - \langle D \rangle)^2 \right\}^{1/2} \quad (20)$$

where $D_{ij}$ is the density of the array of $n_E \times n_E$ pixels which is used in calculating local variances, and <D> is the average density of the array and expressed by:

$$\langle D \rangle = \frac{1}{n_E^2} \sum_i \sum_j D_{ij} \quad (21)$$

(3) Step of Calculating Edge Intensity

In order to determine the edge intensity $E_0(x,y)$ after the local variance $\sigma(x,y)$ shown in the above equation (20) is calculated from the original image $I_0(x,y)$, the following equation (22) involving an exponential function may be employed:

$$E_0(x,y)=1-\exp[-\sigma(x,y)/a_E] \quad (22)$$

where $a_E$ is a factor for converting the value of local variance $\sigma(x,y)$ into the edge intensity and if the threshold of the local variance $\sigma(x,y)$ assigned to the edge intensity $E_0=0.5$ is written as $\sigma_T$, $a_E$ is represented as follows:

$$a_E=-\sigma_T/\log_e(0.5) \quad (23)$$

The value of $\sigma_T$ must be adjusted to an appropriate value depending upon the intensity of granularity and the magnitude of the signal for the contour of the subject. With a color image of 8 bits (256 gradations) for each color, $\sigma_T$ preferably takes values within a range of 10–100. The time of calculations required to effect conversion from $\sigma(x,y)$ to $E_0(x,y)$ can be shortened by using look-up tables (LUT).

The formula for determining the edge intensity $E_0(x,y)$ is by no means limited to the equation (22) and other formulae may be substituted, as exemplified by the following Gaussian function:

$$E_0(x,y)=1-\exp\{-[\sigma(x,y)]^2/a_{E1}^2\} \quad (24)$$

where $a_{E1}$ is a coefficient for converting $\sigma(x,y)$ into $E_0(x,y)$ and if the threshold of the local variance $\sigma(x,y)$ assigned to $E_0(x,y)=0.5$ is written as $\sigma_T$, $a_{E1}^2$ is represented as follows:

$$a_{E1}^2=-\sigma_T^2/\log_e(0.5) \quad (25)$$

With a color image of 8 bits (256 gradations) for each color, $\sigma_T$ preferably takes values within a range of 10–100.

It should be noted here that the above-described local variance method is not the only way to be used for edge detection in the present invention and other edge detecting techniques may be employed, such as ones based on first and second differentials and which are each divided into subgroups as follows.

The method based on spatial first differentials may employ the following operators, a differential edge extracting operator and a template operator. Examples of the differential edge extracting operator include Prewitt's operator, Sobel's operator, and Roberts' operator which may be expressed by the following equation:

$$g(i,j)=\{[f(i,j)-f(i+1,j+1)]^2+[f(i+1,j)-f(i,j+1)]^2\}^{1/2}$$

Examples of the template operator include Robinson's operator using a 3×3 template equivalent to edge patterns for 8 directions, as well as Kirsh'es operator. Besides these operators, Prewitt operator may be employed.

The method based on spatial second derivatives may employ a Laplacian. This method accentuates noise, so it is often implemented by first applying a blurring process of a normal distribution type before edge detection is performed. Besides this, Pseudo-Laplacian may be employed.

Moreover, in addition to the edge detecting techniques described above, zero-crossing methods such as Marr-Hildreth method, Gaussian filter, DOG (difference of Gaussian) and the like, statistical processing methods such as ripple filtering and the like, the other methods such as Heuckel operator, Frei & Chen operator, Triendl operator, Kasvand operator, Eberlein operator, Tanimoto operator, Fuzzy set, AI, hysteresis smoothing, symmetric hysteresis smoothing and the like.

5) We Next Describe the Process of Calculating the Grainy Component Compressing Coefficient.

The edge intensity $E_0(x,y)$ determined by detecting the edges of the subject image from the original image $I_0(x,y)$ using for example the local variance method is used to calculate the grainy component compressing coefficient data $C_G(x,y)$ by the following equation (1) which has been already represented above:

$$C_G(x,y)=(1-k_G)E_0(x,y)+k_G \quad (1)$$

where $k_G$ denotes a constant for adjusting the degree of compression of the grainy component in the grainy region.

When the compression constant for grainy region $k_G$ is set at 1.0, $C_G(x,y)=1.0$. Then, the compression becomes ineffective. On the other hand, the smaller the value $k_G$ is, the greater the degree of compression is. At the value $K_G$ of 0.0, $C_G(x,y)=E_0(x,y)$. Then, the degree of compression depends on the value of the edge intensity $E_0(x,y)$. In a perfect grainy region in which $E_0(x,y)=0.0$, a maximum compression is applied at $C_G(x,y)=0.0$ and the grainy component becomes 0.0. According to the equation (4), the processed image $I_1(x,y)$ becomes equal to the smoothed image $I_{AV}(x,y)$. Therefore, the value of the compression constant for grainy region $K_G$ is preferably set in the range of 0.0–1.0.

As easily seen from the equation (1), at any value of $K_G$, the edge region in which $E_0(x,y)=1.0$ is subjected to weak compression because of a greater value of $C_G(x,y)$, whereas the grainy region in which $E_0(x,y)=0.0$ is subjected to maximum compression at $C_G(x,y)=K_G$. Therefore, the edge intensity is gradually reduced from the edge region toward the grainy region, together with the compression (graininess suppression) to be more intensely applied. Hence, unnatural phenomenon such as false contour near the boundary between the edge region and the grainy region will not occur.

It is preferred to set the value of the compression constant for grainy region $K_G$ in the range of 0.0–1.0. More specifically, an optimal value is preferably selected as $K_G$ in accordance with the magnitude of the grain and noise in the picture to be processed and with the degree of the sharpness enhancement to be performed.

The graininess suppression by compression is effected on the image which has been subjected to the sharpness enhancement, and the image has a graininess more sharpened than that of the image before sharpness enhancement, together with a greater density variation. In addition, the degree of compression depends on the original graininess and the degree of sharpness enhancement. Therefore, the graininess to be processed is preferably determined to select the compression constant for grainy region.

The density variations of surrounding n×n pixels is referenced to quantify the magnitude of grain (graininess) in terms of a physical value such as RMS granularity a and the compression constant for grainy region $K_G$ will be selected on the basis of that physical value. A specific procedure of selecting the compression constant for grainy region by the RMS granularity σ is described below.

The graininess of color photographic materials is commonly measured with a micro-densitometer having a measuring aperture of 48 $\mu\phi$ and expressed in terms of RMS granularity. With ordinary or typical color negative films such as Super G ACE 100, 200, 400 and 800 (all manufactured by Fuji Photo Film Co., Ltd.), the graininess is in the range of 4–5 (RMS granularity $\sigma_{48}$ times 1000). If digitization is performed by scanning the film with the aperture area A, the granularity of the film for that aperture area, $\sigma_{SC}$, can be calculated from the RMS granularity $\sigma_{48}$ by the following equation (26) using S=$\sigma\sqrt{A}$ which is the well known formula of Selwyn granularity:

$$\sigma_{SC}=\sigma_{48}\sqrt{A_{48}}/\sqrt{A_{SC}} \qquad (26)$$

where $A_{48}$ is the area of the 48 $\mu\phi$ aperture. If the film's granularity is 4 and the digitized scanning aperture is 12 $\mu\phi$ (aperture area is $A_{12}$), SC is calculated as follows:

$$\sigma_{SC}=\sigma_{48}\sqrt{A_{48}}/\sqrt{A_{12}}=0.016 \qquad (27)$$

provided that the blur is of the magnitude whether it is due to the optics or the scanning aperture.

If the granularity $\sigma_{SC}$ increases (or is roughened) by a factor of p upon sharpness enhancement, the following equation will hold:

$$\sigma_{SC}'=P\sigma_{SC} \qquad (28)$$

The compression constant for grainy region $K_G$ is preferably inversely proportional to the roughening factor p of the image to be processed, that is, the equation:

$$K_G=r_G/p \qquad (29)$$

where $r_G$ is a constant for adjusting the compression ratio, is preferably satisfied. In a preferred manner, $r_G$ takes usually a value ranging 0.1–1.0.

When $r_G$32 1.0, grainy fluctuations roughened by sharpness enhancement is compressed to the same level as the original graininess, provided that the roughened grain is more sharpened than the original grain. When $r_G$<1.0, the roughened grain is more compressed to provide a graininess smaller than the original graininess. When 1.0<$r_G$<p, the roughened grain is compressed to yield a graininess lying between the original graininess and the graininess after sharpness enhancement.

6) We Next Describe the Step of Compressing the Grainy Component.

The previously determined first edge/grain composite component $\Delta I_{EG}$ (x,y) in which the edge region of the subject image and grainy region were both subjected to sharpness enhancement can be multiplied by the grainy component compressing coefficient data $C_G$ (x,y) of the above equation (1) to obtain the second fine image data $\Delta I_{EG}'$ (x,y) in which the grainy component in the grainy region is only compressed, as shown in the following equation (30):

$$\Delta I_{EG}'(x,y)=C_G(x,y)\cdot\Delta I_{EG}(x,y) \qquad (30)$$

7) We Next Describe the Step of Calculating the Final Processed Image After Graininess Suppression and sharpness Enhancement.

The grainy component image $\Delta I_{EG}'$ (x,y) as determined by the equation (30) in which the graininess is suppressed by compression is added to the smoothed image $I_{AV}$ (x,y) obtained from the original image to thereby yield the final processed image $I_1$ (x,y) with suppressed graininess while enhancing sharpness, as shown in the equation (31):

$$I_1(x,y)=I_{AV}(x,y)+\Delta I_{EG}'(x,y) \qquad (31)$$

In the final processed image $I_1$ (x,y), the contour region of the subject in the original image $I_0$ (x,y) is enhanced in sharpness, whereas the grainy pattern in the grainy region is sharpened. Thus, the image $I_1$ (x,y) is suppressed in amplitude of the grainy fluctuations.

The step of compressing the grainy component and the step of calculating the final processed image after graininess suppression and sharpness enhancement may be performed at the same time.

Described above are the basic compositional features of the image processing method of the invention and the image processing apparatus for implementing the above method.

While the method and apparatus of the invention for processing digital images to suppress their noise and enhance their sharpness have been described above in detail with reference to the embodiments, the invention is by no means limited thereto and various improvements and design modifications can of course be made without departing from the scope and spirit of the invention.

According to the image processing method and apparatus of the invention, the original image is first subjected to sharpness enhancement to sharpen both the subject image and the grain; the contour of the subject and the grainy component are extracted from the image; and the amplitude of the density fluctuations of the grainy component in the grainy region is compressed to suppress the graininess; the grain finally obtained has a natural visual impression that is spatially finer and characterized by smaller density changes than it initially was. Since the grain of the original image is sharpness enhanced and fined spatially in the present invention, the grain ultimately obtained is as fine as can be produced when using fine-grain emulsions in silver halide photographic materials and a natural grain suppressing effect is achieved without causing any visual oddities or unpleasing sensation such as "blurry graininess" which is caused in the prior art using a smoothing technique.

If the image processing method of the invention is applied to silver halide color photographic materials, an improvement is achieved in both graininess and sharpness without causing any artificiality and oddities due to "blurry graininess" which have been unavoidable from the prior art process of suppressing. graininess while enhancing sharpness and this marked improvement offers a substantial benefit to the industry.

The method and apparatus of the invention for processing digital images to suppress noise and enhance sharpness will now be described with reference to the following specific example.

EXAMPLE 1

A photographic image recorded on a 35-mm color negative film FUJICOLOR SUPER G ACE 400 (product of Fuji Photo Film Co., Ltd.) was read with a scanner SCANNER & IMAGE PROCESSOR SP-1000 (product of Fuji Photo Film Co., Ltd.; pixel number, 2760×1840) and converted into a digital image of 8 bits for each of R, G and B colors. This original image was processed by the method of the invention using the image processing apparatus 14 shown in FIG. 1 according to the flowchart shown in FIG. 3.

The process of sharpness enhancement was performed by Gaussian unsharp masking according to equation (8) using the following 3×3 unsharp mask:

–0.50 –0.82 –0.50

–0.82 6.27 –0.82

–0.50 –0.82 –0.50

The smoothing process consisted of multiplication by a normal distribution function to effect averaging. The processing mask was one of 9×9 pixels expressed by equation (16) which was used in such a way that the sum of the values of all pixels would be 1.0. The result was the same as would be attained by processing with a low-pass filter.

For edge detection, an array of 3×3 pixels as shown in FIG. 4 was used and a local variance method was performed in accordance with the equation (20). For determining the edge region weighting coefficient $W_E(x,y)$, nonlinear transformation was performed in accordance with the equation (22), in which the value of $\sigma_T$, or the threshold of local variance for edges, was set at 30.

Figure 5A:
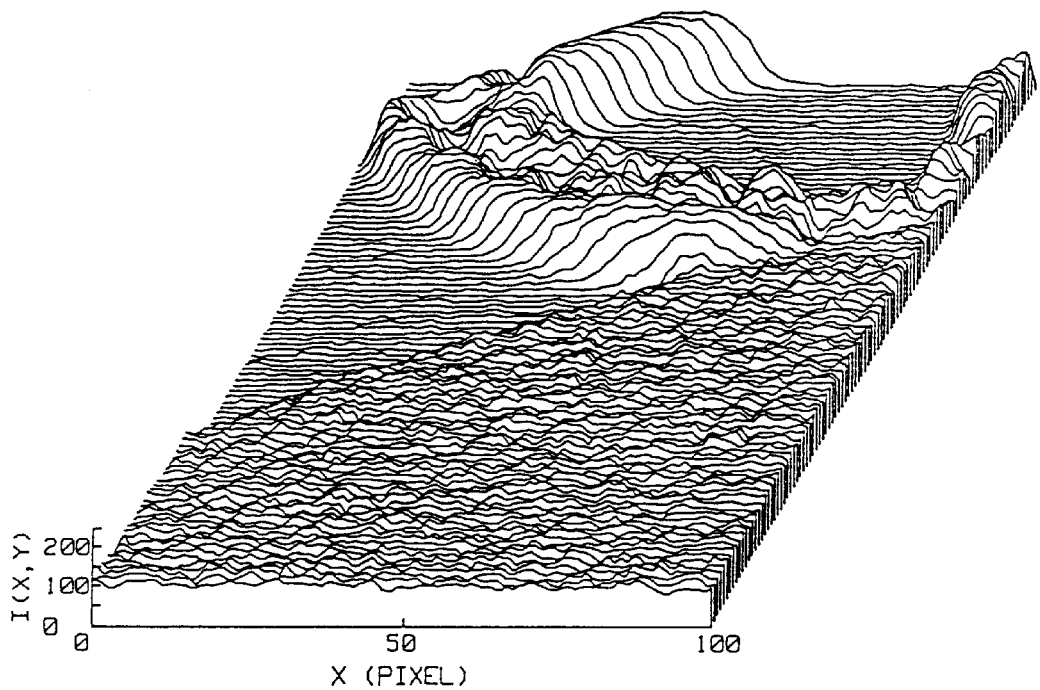
FIG. 5a shows a three-dimensional density profile of an original image in a scene obtained in an embodiment of the invention.
Figure 5B:
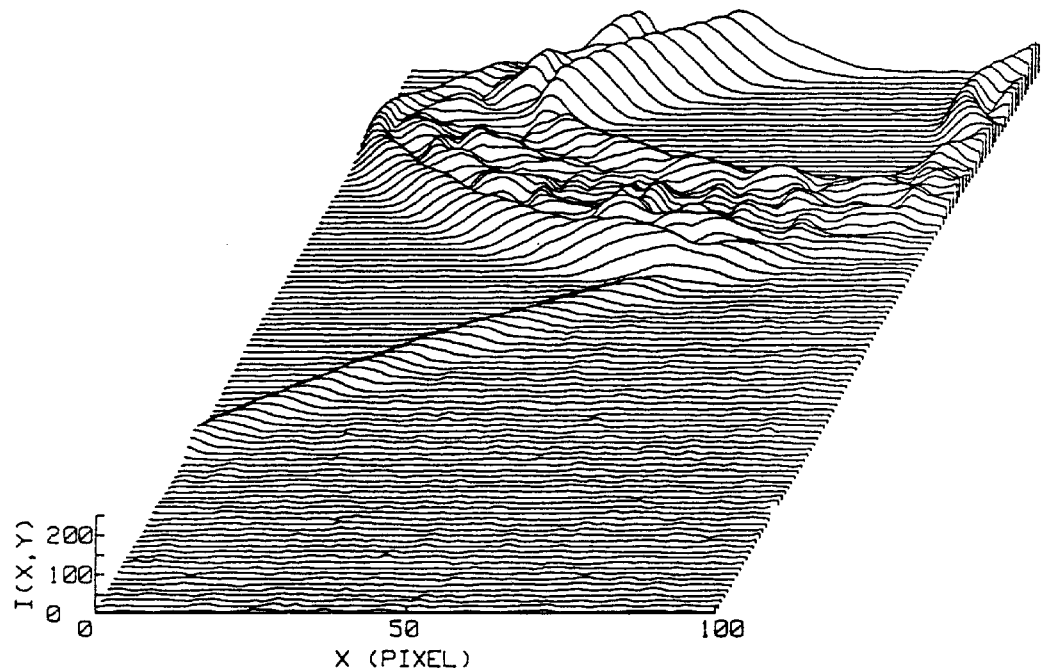

Three-dimensional image density profiles as obtained by application of the image processing method of the invention are shown for a single scene in FIGS. 5a–8b ranging from the original image $I_0$ to the final processed image $I_1$. FIG. 5a refers to an original image $I_0$, FIG. 5b an image after edge detection $E_0$, FIG. 6a a sharpness enhanced image $I_s$, FIG. 6b a smoothed image $I_{AV}$, FIG. 7a a second grain/edge composite component $\Delta I_{EG}'$, FIG. 7b grainy component compressing coefficient data in grainy region $C_G$, FIG. 8a an image $\Delta I_{EG}'$ obtained by subjecting the grain/edge composite component to grainy component compression processing, and FIG. 8b a final image $I_1$ after graininess suppression and sharpness enhancement.

Figure 6A:
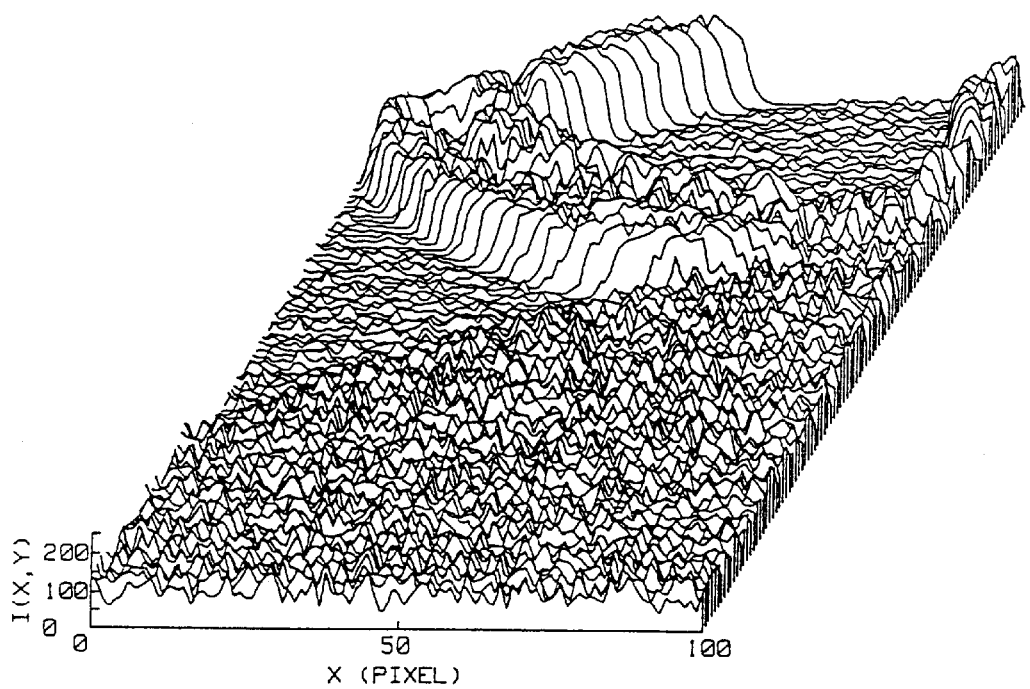
Figure 6B:
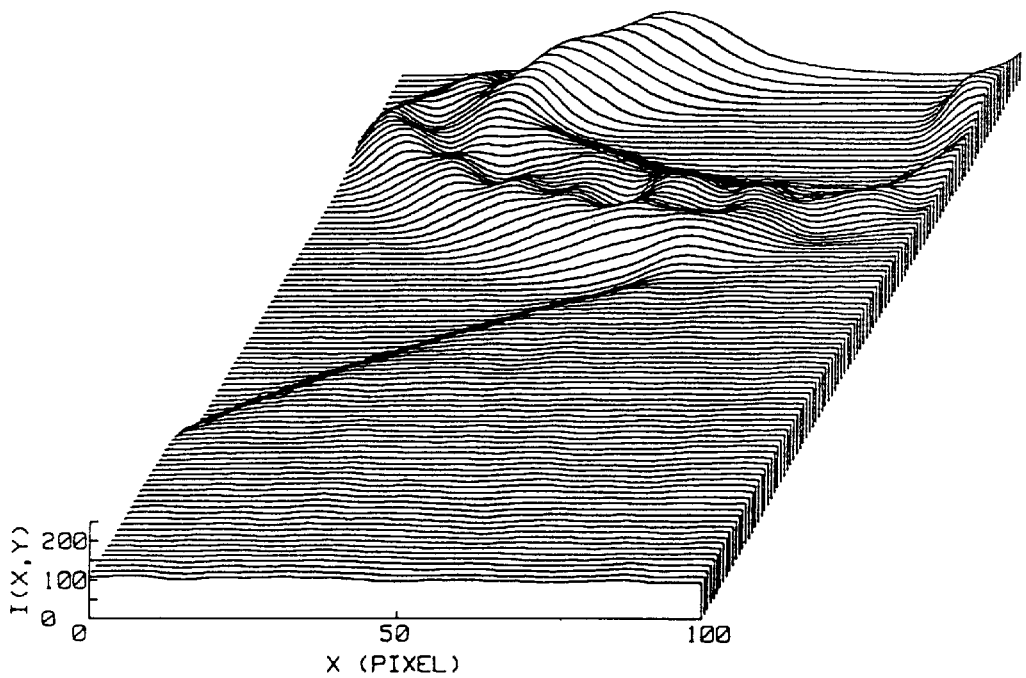
Figure 7A:
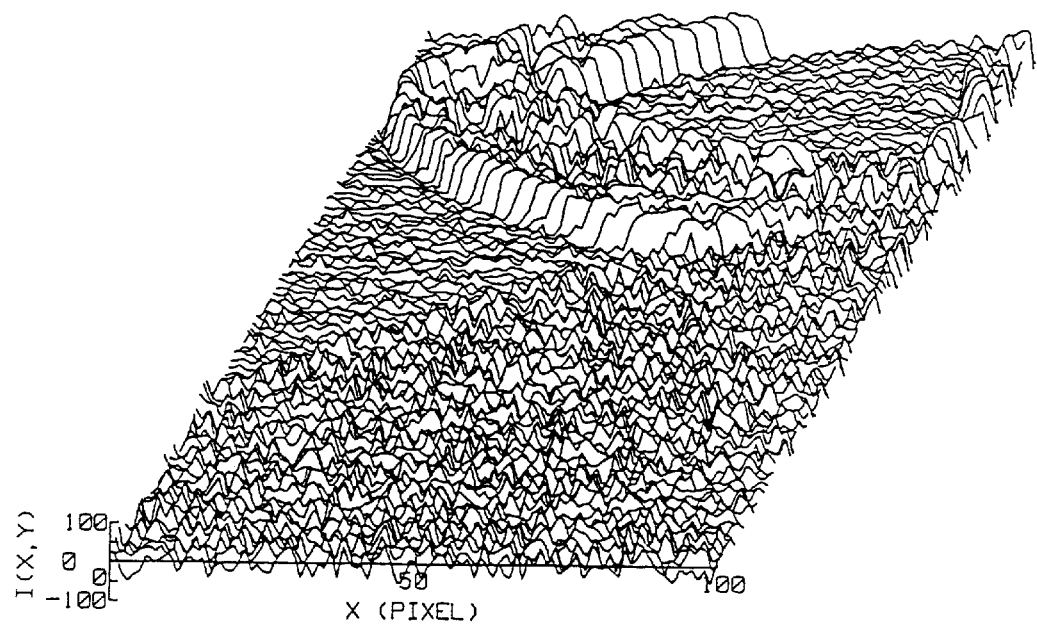
Figure 7B:
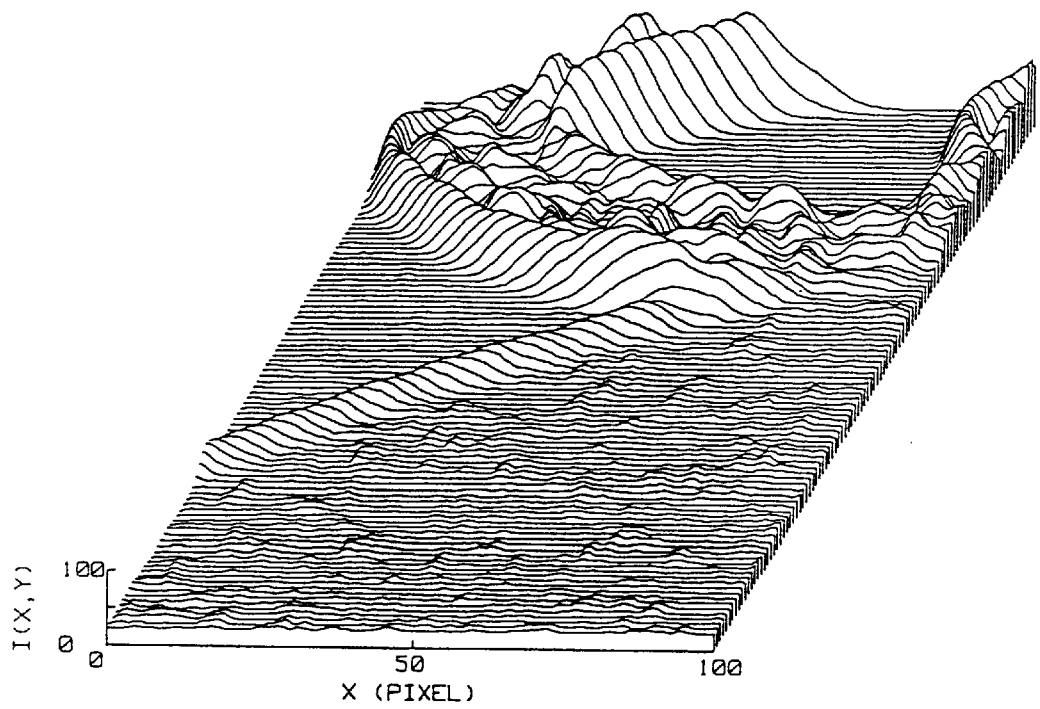
FIG. 7b shows a three-dimensional density profile of a grainy component compressing coefficient data in the grainy region in the above scene.
Figure 8A:
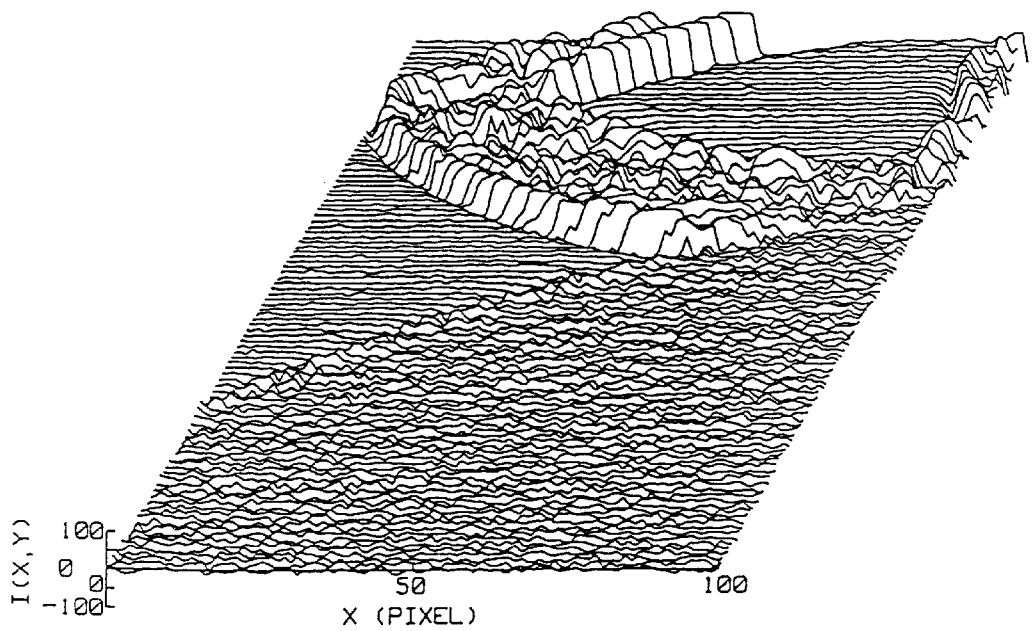

As seen from the above drawings, in the sharpness enhanced image in FIG. 6a, the edge region in the subject image and the grainy region are both enhanced, which is shown as the grain/edge composite component in FIG. 7a. The grainy region is only selectively suppressed in graininess by multiplying the grain/edge composite component by the grainy component compressing coefficient in FIG. 7b. Thus, the graininess is only suppressed while retaining the edge sharpness, as shown in FIG. 8a.

Figure 8B:
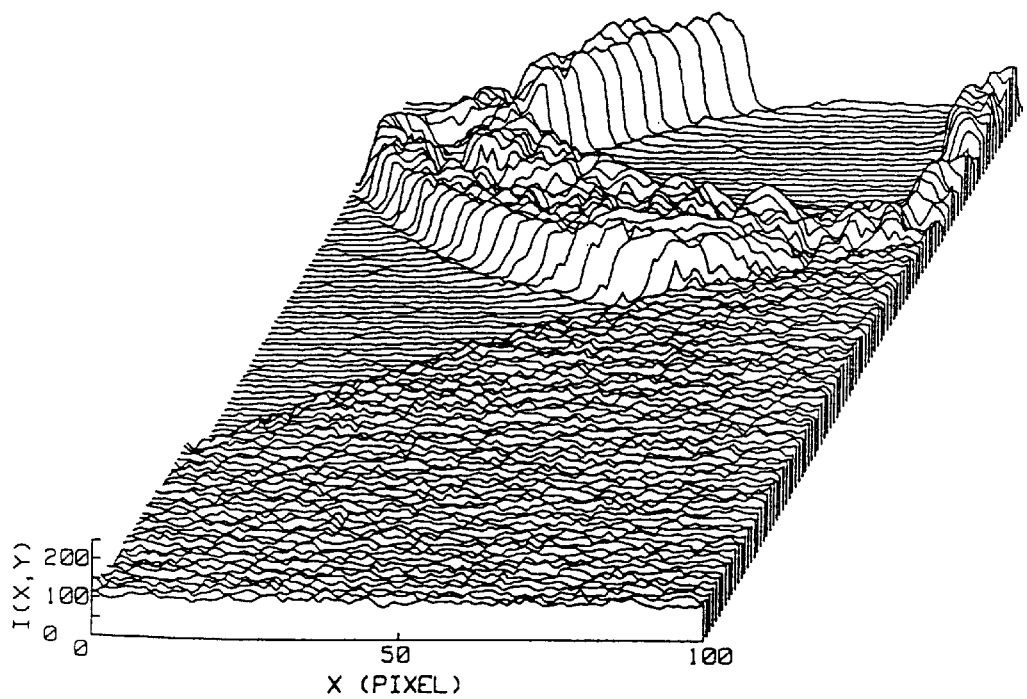
FIG. 8b shows a three-dimensional density profile of the final image after graininess suppression and sharpness enhancement.

In the final processed image in FIG. 8b, the graininess is significantly improved while maintaining the edge sharpness as compared to the sharpness enhanced image in FIG. 6a. In spite of the sharpness of the subject image significantly enhanced as compared to the original image in FIG. 5a, it is found that the graininess is not roughened but significantly improved. As for graininess in particular, spatially rather large grainy fluctuations are reduced to provide a finer grainy pattern. The large grainy fluctuations give a visually unpleasing impression. Hence, reduction of the grainy fluctuations and fining of the grainy pattern have an effect corresponding to the fining of film particles, and can provide a visually preferred and pleasing granularity.

When the image processing method of the invention was applied to photographic images recorded on common silver halide photographic materials including color negative or reversal films and black-and-white films [35-mm films, brownie type films, APS (advanced photo system), films with lens (LF) and instant photography], both graininess and sharpness were improved to produce readily appreciable effects.

In particular, the improvement in graininess has an effect of fining the grainy pattern by sharpening and fluctuation compressing, and was comparable to the result achieved by fining the emulsion grains in photographic materials and there was not any visual unnaturalness or oddities due to "blurry grain" which were unavoidable defects of the various prior art methods of removing graininess based on an averaging process or the reduction of fluctuations, and psychologically pleasing graininess was obtained. As for image sharpness, the combination with the above-described process of graininess suppression was effective in producing a significantly greater enhancing effect than the conventional unsharp masking and Laplacian filter.

When adding the image processing method of the invention to the image processing method used in the image forming method and the photographic materials as described in Examples of EP-A-800,114, both graininess and sharpness of the photographic image were improved to produce readily appreciable effects, as in the above Example 1.

What is claimed is:

1. A method for processing a digital image for noise suppression and sharpness enhancement, comprising the steps of:

performing a sharpness enhancing process on original image data to create sharpness enhanced image data in which not only an image but also a grain or noise contained therein is sharpened;

performing a smoothing process on said original image data to create smoothed image data;

subtracting said smoothed image data from said sharpness enhanced image data to create first edge/grain composite image data comprising edges of a subject image and grains which are both enhanced in sharpness;

performing an edge detection of said original image data to determine an edge intensity data for discriminating an edge region of a subject and a grainy region;

using said edge intensity data to determine grainy fluctuation compressing coefficient data for compressing amplitude of an grainy fluctuation component in the grainy region;

multiplying said first edge/grain composite image data by said grainy fluctuation compressing coefficient data to compress only the grainy fluctuation component in the grainy region selectively, and to thereby create second edge/grain composite image data in which the grains in the grainy region are suppressed while retaining the sharpness of the edges in the edge region of the image; and adding said second edge/grain composite image data in which the grains are suppressed while enhancing the sharpness to said smoothed image data to thereby create an processed image.

2. The method according to claim 1, wherein said grainy fluctuation compressing coefficient data has a value equal or close to 1.0 in said edge region of said subject and is gradually decreased from said edge region toward said grainy region, where said compressing coefficient data takes a specified value ranging between 0.0–1.0.

3. The method according to claim 1, wherein said grainy fluctuation compressing coefficient data is represented by equation (1):

$$C_G(x,y) = (1-k_G)E_0(x,y) + K_G \qquad (1)$$

where $C_G(x,y)$ denotes the grainy fluctuation compressing coefficient data, $E_0$ denotes said edge intensity data (normalized $E_0$ ($0 \leq E_0 \leq 1$)), and $k_G$ denotes a grain compressing constant for adjusting the degree of compression of the grainy component in the grainy region and is a value ranging between 0.0–1.0.

4. The method according to claim 1, wherein said edge detection is performed by one of a local variance method, a spatial first differential method and a spatial second differential method.

5. The method according to claim 1, wherein said edge detection is performed by a local variance method.

6. The method according to claim 1, wherein said sharpness enhancing process is one of Gaussian unsharp masking, differentiation filtering and spatial frequency filtering.

7. The method according to claim 1, wherein said sharpness enhancing process is Gaussian unsharp masking.

8. The method according to claim 1, wherein said smoothing process is Gaussian blurry masking.

9. The method according to claim 1, wherein said smoothing process is one of processes directed to a real space domain and a spatial frequency domain.

10. The method according to claim 1, wherein said sharpness enhancing process is applied in a sufficiently intense manner.

11. The method according to claim 1, wherein said grainy fluctuation compressing coefficient data is used to perform a weighting operation in the edge region of said subject and the grainy region.

12. The method according to claim 11, wherein said grainy fluctuation compressing coefficient data gradually changes relative proportions of the edge region and the grainy region.

13. An apparatus for processing a digital image for noise suppression and sharpness enhancement, comprising:

- a sharpness enhancing unit for performing a sharpness enhancing process on original image data to create sharpness enhanced image data in which not only an image but also a grain or noise contained therein is sharpened;
- a smoothing unit for performing a smoothing process on said original image data to create smoothed image data;
- an edge/grain composite component extracting unit for subtracting said smoothed image data from said sharpness enhanced image data to create first edge/grain composite image data comprising an edge of a subject image and a grain which are both enhanced in sharpness;
- an edge detecting unit for performing an edge detection of said original image data to determine an edge intensity data for discriminating an edge region of a subject and a grainy region;
- a grain compressing coefficient calculating unit for determining grainy fluctuation compressing coefficient data for compressing amplitude of an grainy fluctuation component in the grainy region based on the edge intensity data;
- a grainy component compressing unit for multiplying said first edge/grain composite image data by said grainy fluctuation compressing coefficient data to compress only the grainy fluctuation component in the grainy region selectively, and to thereby create second edge/grain composite image data in which the grains in the grainy region are suppressed while retaining the sharpness of the edge in the edges region of the image; and
- an output image calculating unit for adding said second edge/grain composite image data in which the grains are suppressed while enhancing the sharpness to said smoothed image data to thereby create an processed image.

* * * * *